Oct. 7, 1924.

M. SMOLENSKY

CHECK VALVE

Filed Oct. 8, 1923

INVENTOR
Michael Smolensky
BY
John A. Bommhardt
ATTORNEY

MICHAEL SMOLENSKY, OF CLEVELAND, OHIO.

CHECK VALVE.

Application filed October 8, 1923. Serial No. 667,346.

*To all whom it may concern:*

Be it known that I, MICHAEL SMOLENSKY, a citizen of Poland, residing at Cleveland, in the county of Cuyahoga and State of Ohio, have invented certain new and useful Improvements in Check Valves, of which the following is a specification.

This invention relates to improvements in check valves having for an object to provide a noiseless valve in which the body or valve casing is of such a proportional size with respect to the pipe ends to which it is connected, as to require a minimum amount of opening of the valve disk to permit passage through the valve casing of the maximum flow of fluid through said pipes.

A further object is to provide a valve wherein is included means for insuring perfect seating of the valve disk regardless to wear upon certain members designed to centrally position the valve disk.

A still further object is to enclose the valve disk closing means and protect it against deterioration resulting from contact with fluid passing through the valve.

Other objects will be in part obvious and in part pointed out hereinafter.

In order that the invention and its mode of operation may be readily understood by persons skilled in the art, I have in the accompanying illustrative drawings, and in the following detailed description based thereon set out two possible embodiment of the same.

Having more particular reference to the drawings throughout which similar characters of reference designate similar parts, this improved check valve may be stated as comprising a main body portion or casing 5, having centrally arranged a passage way 6, through which the fluid is adapted to pass and in which the valve disk is arranged. This body or casing is of a size considerably greater than the pipe sections to be connected and is provided near its periphery with a set of bolt openings 7, said bolt openings being in the form of separate compartments with respect to passage way through the valve body, whereby to prevent contact of the fluid and the bolts by which the valve body is secured in position.

Figure 1:
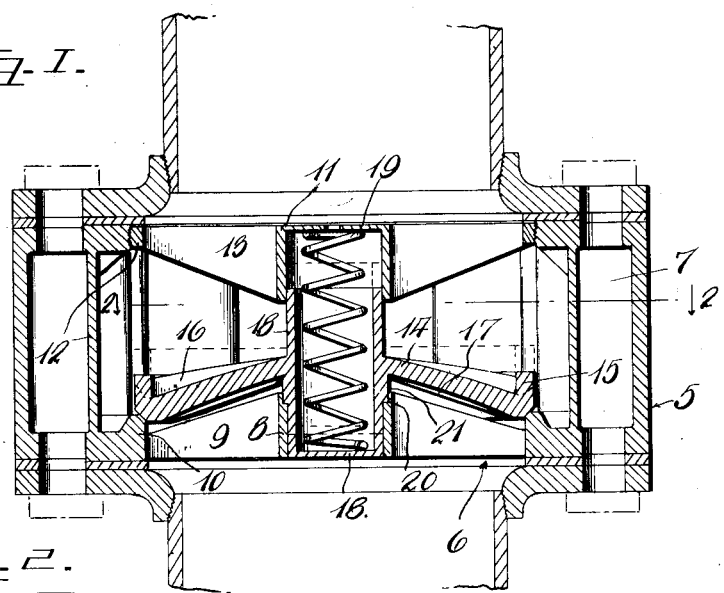
Fig. 1 is a vertical longitudinal section showing a valve constructed in accordance with my invention, and connecting the adjacent ends of two pipe sections.
Figure 2:
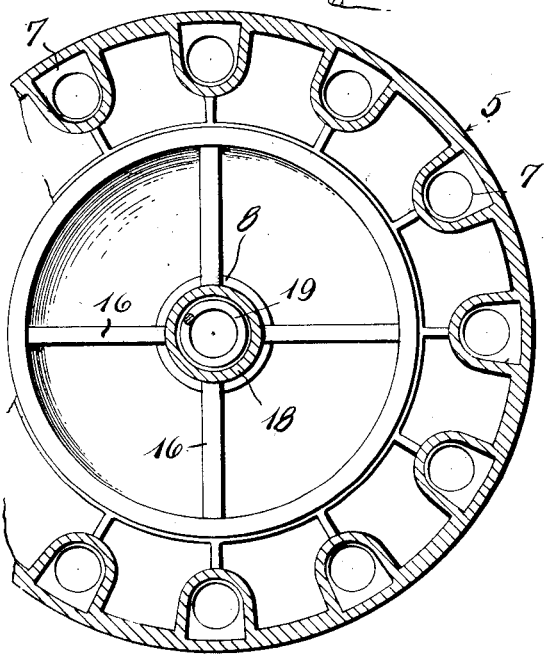
Fig. 2 is a section taken on the line 2—2 of Fig. 1.
Figure 3:
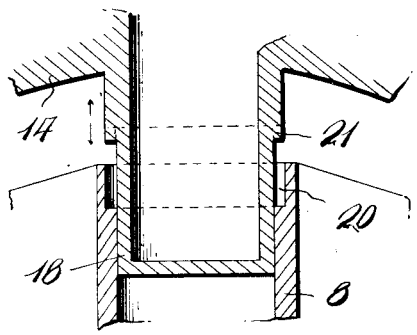
Fig. 3 is a detail view of the means employed for accurately seating the valve, this view showing the valve and said means in its raised or open position.

Formed integrally with the body 5 and at one end of the passage way therethrough is what I term a spider cylinder 8, centrally positioned by means of a set of radial ribs 9, as clearly indicated in Figs. 1 and 3. Between the outer ends of these ribs 9 and the wall of the passage way is a valve seat 10, which as shown in Fig. 1 is of such a length that regrinding thereof at intervals is possible. It is understood that this regrinding is often necessary and in the majority of valves the extent of this operation is quite limited.

As is clearly shown in Fig. 1 the area or diameter of the passage way through the body or valve is approximately 25% greater than that of the connected pipes, the result being that it is necessary to only slightly open the valve disk in order to accommodate the full volume of fluid passing through said pipes. Arranged at the end of the valve body opposite the seat 10, is a second spider cylinder 11, which is removably positioned in the passage way by means of a screw threaded ring 12, to which the cylinder is attached by means of ribs 13. This cylinder 11, co-acts with the heretofore mentioned cylinder 8, in formation of guide means for the valve disk.

By reference to Fig. 1 it will be seen that the valve disk or plug 14 consists of a dished disk having at its periphery an annular flange 15, and at the juncture of these two members is formed an angular face adapted to contact snugly with the valve seat 10. As shown, I have provided reinforcing ribs 16 and 17 whereby to insure against breaking or damaging the valve disk.

Arranged centrally with respect to the valve disk 14, and extended in opposite directions from the opposed faces of said disk is a pair of guide posts 18, said posts being preferably in the form of inter-connecting cylinders whose outer ends are slidably and snugly received in the aforeder 11 as shown is provided with an opening whereby to prevent undue compression of air upon opening of the valve disk.

It is quite obvious that continual opening and closing of this valve together with the usual vibration will cause a certain degree of wear as between the guide posts or cylinder 18 and the spider cylinder 8, the consequence being that a snug fit would not be possible, thereby resulting in improper seating of the valve disk. This fault is overcome by providing the cylinder 8 at its inner open end with an annular channel or groove 20 in its inner face which is adapted to snugly receive an annular shoulder or rib 21 carried by the guide post or cylinder 18 adjacent its point of connection with the valve disk body.

It is seen that when the valve disk is closed the shoulder and channel are snugly interengaged thereby preventing relative movement as between the valve disk and its seat, whereas when the valve disk is open, the rib or shoulder and the channel are entirely disengaged, with the result that the wear taking place is confined to that portion of the spider cylinder and guide post 18 apart from said shoulder and channel. Even excessive vibration and longitudinal movement of the valve disk when open will not result in any wear upon this shoulder or its receiving channel and in this way there is assured proper and accurate seating of the valve disk due to the snug fit of these members.

Figure 4:
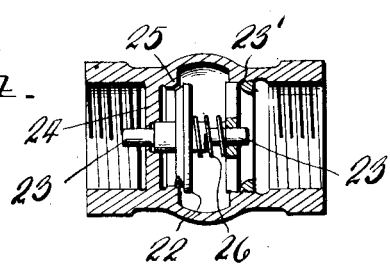
Fig. 4 is a vertical longitudinal section of the slightly modified form.

In Fig. 4 is illustrated a slightly modified construction, this modification including a slight variance of construction to permit direct connection of the valve casing with the pipe ends.

In this modification the valve disk 22 and its guide posts are cast from a single block of metal, one of the posts 23 being provided with an enlarged portion or shoulder adapted for snug engagement in an annular channel or groove formed in a transverse web 24, which is integrally formed with the valve casing.

This modification also includes a valve seat 25. Arranged adjacent the valve seat 25 is a removable spider 23 carrying a centrally disposed guide cylinder adapted for the reception of one of the valve disk guide members and further adapted to co-act with the valve disk in the reception of a coil expansion spring 26, which is adapted to yieldably and snugly seat the said valve disk. The operation and general coaction of the parts in this modified form is substantially 1. A check valve comprising a body portion having a passage way and a valve seat, a spider cylinder arranged centrally at each end of the passage way, a valve disk yieldably positioned upon the seat, oppositely directed guides carried by the disk, and received in the cylinders, and co-acting means carried by a guide and its spider cylinder to compensate for wear upon said guide whereby to cause accurate seating of the disk.

2. A check valve comprising a body portion having a passage way and valve seat, a valve disk normally yieldably positioned upon the seat, a spider cylinder arranged centrally at each end of the passage way, guides carried by the valve disk and receivable in the cylinders, one of said cylinders having an annular channel at its inner end portion, and a shoulder carried by a valve disk adapted to snugly fit in the channel when the valve disk is seated and to clear the channel upon opening the disk as and for the purpose set forth.

3. A check valve comprising a body portion having a passage way therethrough and a valve seat, a valve disk adapted to rest on the seat, a spider cylinder arranged centrally at each end of the passage way, oppositely directed guide posts carried by the valve disk, and received in the cylinders, and a spring enclosed in the guide posts and cylinders and adapted to yieldably position the disk upon its seat.

4. A check valve including a casing, a valve seat, a valve disk, oppositely directed, centrally disposed guide posts carried by the disk upon its opposed faces, an annular shoulder formed upon one of said posts adjacent its inner end, a guide cylinder carried by the casing and adapted for the reception of the shouldered guide post, said cylinder having an annular channel formed at its inner end and adapted to normally snugly receive said shoulder as and for the purpose set forth.

5. A check valve including a body having a passage way therethrough, a valve seat, a guide cylinder arranged centrally at opposite ends of said passage way, a valve disk, guide posts carried by the disk and receivable in said cylinders, and means carried by one of said posts and its receiving cylinder whereby to compensate for wear upon the guide members and accurately seat the disk.

In testimony whereof, I affix my signature.

MICHAEL SMOLENSKY.